April 11, 1950     H. A. SCHEEL     2,504,091
TRAWLING DEVICE

Filed Oct. 28, 1946     2 Sheets-Sheet 1

INVENTOR.
Henry A. Scheel
BY H. F. Kirkpatrick
ATTORNEY

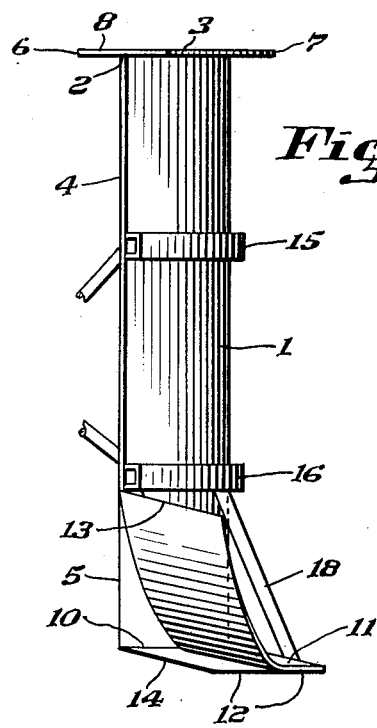
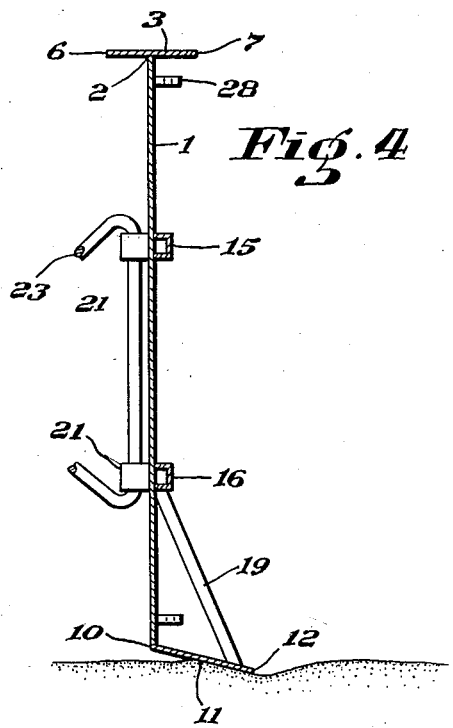
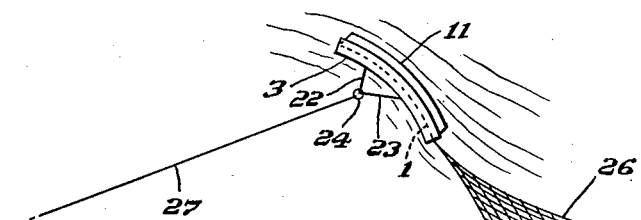
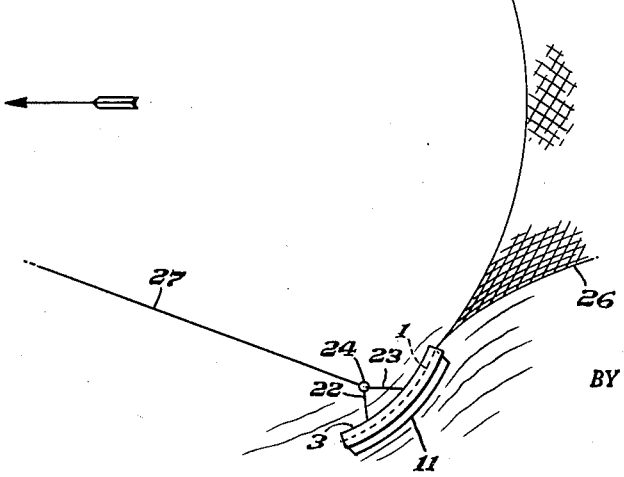

Patented Apr. 11, 1950

2,504,091

UNITED STATES PATENT OFFICE 2,504,091

TRAWLING DEVICE

Henry A. Scheel, New York, N. Y., assignor to Fishing Research Corporation, New York, N. Y., a corporation of Delaware Application October 28, 1946, Serial No. 706,251

3 Claims. (Cl. 43—9)

This invention relates to trawling devices and more particularly to that general type of trawling device, heretofore known as sheering, otter or trawl boards or doors, which are adapted to spread the mouth of a trawl net laterally for the purpose of catching fish or other aquatic fauna, the said net being disposed either in direct contact with or somewhat above the sea bottom.

The principal object of this invention is to tow with greater ease and extend laterally more widely the mouth of a given trawl net than has been accomplished heretofore. Another object is to provide a trawling device of the type, to which this invention relates, which has in operation greater longitudinal and transverse stability, a greater componental force lateral to the direction in which the net is towed and less resistance to the sea bottom than previously known trawling devices of this type.

Among the features of this invention is a laterally curved, vertical plate, provided on and along its top edge with a flat, horizontal plate and along its bottom edge with an outwardly and downwardly extending plate or skid, the forward portion of which is curved upwardly.

Other objects and features of this invention will appear from the following description taken in conjunction with the accompanying drawings, showing the preferred form of the device, in which—

Fig. 3 is a front view in elevation;

Fig. 4 is a cross-sectional view on the line 4—4 of Fig. 2; and

Fig. 5 is a diagrammatical view of two trawling devices, port and starboard, in operation, illustrating the sides of the mouth of the trawl net attached thereto.

Figure 1:
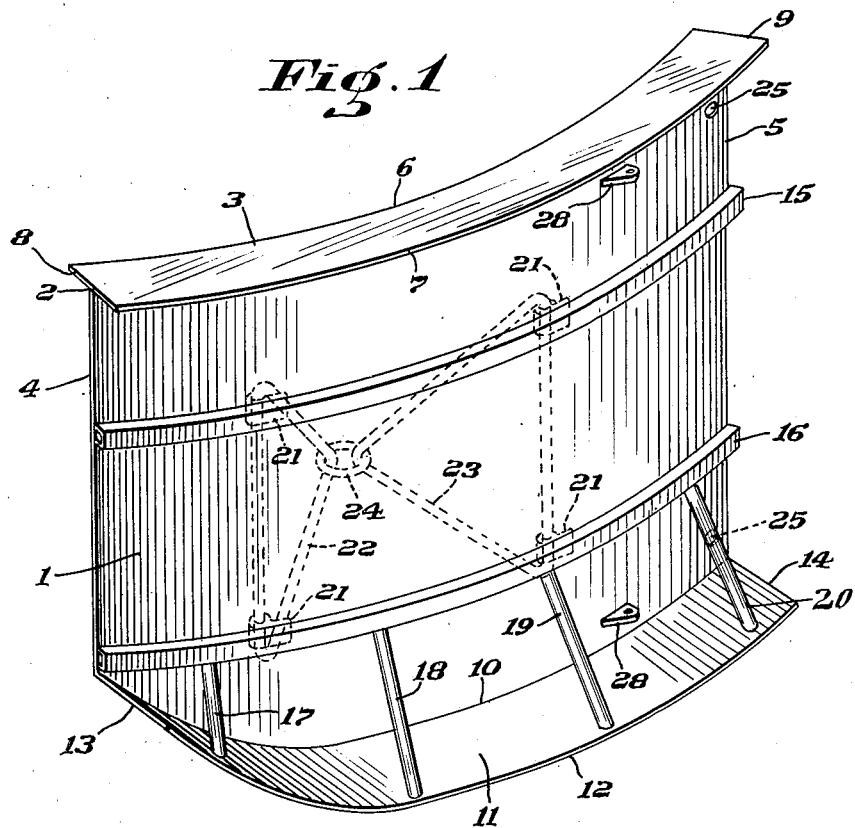
Fig. 1 is a perspective view of the novel trawling device of this invention as employed on the port side of the mouth of a trawl net.
Figure 2:
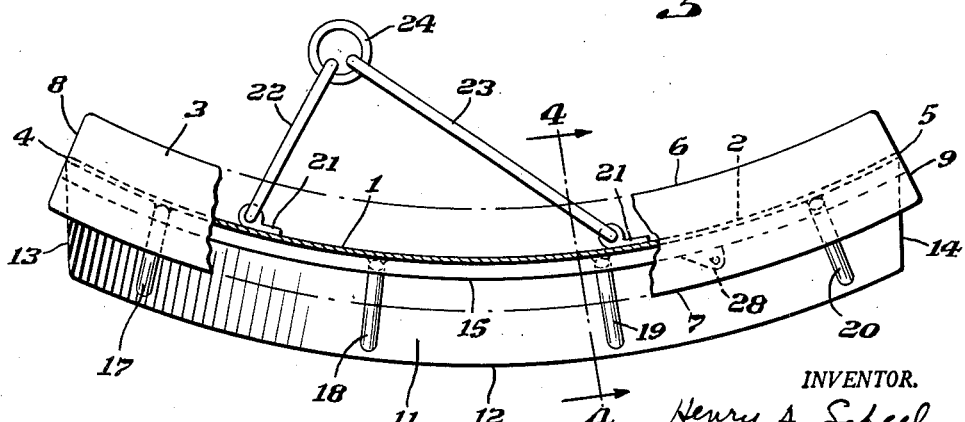
Fig. 2 is a plan view partly in section.

The essential part of the trawling device, as shown in Figs. 1 through 4, consists of a curved plate 1 which is in a substantially vertical position when said device is towed in fishing operations. The plate 1 has its end edges in a vertical plane and is curved from one edge to the other so as to provide increased lateral lift. Mounted on the top edge 2 of the plate 1 is a top plate 3 which is horizontal and flat, extending from the straight vertical forward edge 4 to the after edge 5 along, and extending laterally across, the top edge 2 of the plate 1 and serves to longitudinally stabilize the device when towed and to greatly increase the lift efficiency of the plate 1. The side edges 6 and 7 of the top plate 3 are curved so that they are parallel to the top edge 2 of the plate 1. The straight horizontal forward edge 8 and after edge 9 of the top plate 3 extend respectively across the forward and after ends of the top edge 2 of the plate 1 at right angles to said top edge.

The curved bottom edge 10 of the plate 1 is laterally parallel to the top edge 2 being horizontal amidships and aft, but curved upwardly forward. Secured to the bottom edge 10 is a bottom portion here shown as a bottom plate 11 which extends outwardly and downwardly therefrom at a slight angle below the horizontal throughout the length of said bottom edge and is curved upwardly forward, as shown in the drawings. The outer edge 12 is curved so that it is parallel to the bottom edge 10. The forward edge 13 and the after edge 14 of the bottom plate 11 are straight and extend downwardly and outwardly from the forward and after ends, respectively, of the bottom edge 10. Though the bottom plate as above described provides the preferred means for the purpose, any sort of a bottom portion adapted to rest upon and be drawn along the sea bottom will answer though at some sacrifice of ease of towing.

Stiffener channels 15 and 16, preferably of the relative size and shape shown, are secured to the convex side of the plate 1 and extend horizontally from the forward edge 4 to the after edge 5 of said plate.

Straight struts 17, 18, 19 and 20, the cross-sections of which are preferably circular, are secured at their lower ends to the top surface of the bottom plate 11 near the outer edge 12, extend upwardly and inwardly in substantially vertical planes, and are secured at their upper ends to the convex side of the plate 1 and preferably to the underside of the stiffener channel 16.

Four yoke clips 21 are secured to the concave side of the plate 1 in pairs preferably opposite the stiffener channels, as shown. Two yokes 22 and 23, joined together at their outer extremities by a ring 24, pass freely through the yoke clips 21.

Near the top and bottom of the after edge 5 of the plate 1 are holes 25 through which shackles or other suitable fastening are secured to attach the port side of the mouth of a trawl net. Alternatively, short lines or cables may be attached to the device and led aft to the net.

Near the top and bottom on the convex side of the plate 1 at positions approximately onefourth the length of the plate 1 forward of the after edge 5 are located clips 28 to which the net alternately may be attached.

A horizontal, straight line drawn from the forward edge 4 to the after edge 5 constitutes the chord-length of the plate 1. Another horizontal straight line perpendicular to and extending from said chord-length to a point on the concave side of the plate 1 furthest from said chord-length constitutes the chord-depth of said plate. The ratio of said chord-depth to said chord-length of the plate 1 of this invention is preferably .095±.045, with an optimum of the order of .120 to .140.

The trawling device employed on the starboard side of the net is the same as the port device described above except that it is curved laterally in the opposite direction and is, of course, attached to the starboard side of the mouth of the trawl net. The lateral asymmetrical features, namely, the struts, the stiffener channels, the yoke clips, yokes ring and clips 28 are laterally reversed.

Fig. 5 shows the port and starboard trawling devices of this invention in operation with a trawl net 26 attached thereto and being towed aft thereof in the direction of the arrow. Tow lines 27 lead forwardly and upwardly from the rings 24 to a trawler or other suitable vessel.

The trawl door forming the subject matter of this invention may be made in any suitable convenient manner, as, for instance, by pressing or welding the various component parts thereof together. For instance, the transversely curved vertical plate 1 may be the segment of a cylinder and the deflecting top plate 3 may be welded to the vertical plate 1 in the customary manner. The upwardly curving edge 10 of the plate 1 may be cut or burned out of the segment of the cylinder in any suitable manner and the bottom plate 11 may be secured to the bottom of the vertical plate 1 by welding, the one end of the bottom plate 11 being curved upwardly so as to conform with the same general upward curvature as that of the upwardly curved end of plate 1.

Actual use, in fishing operations, of the device of this invention has demonstrated that it can be readily and easily towed at a very much less expenditure of power and, if desired, at even greater speeds than now conventionally employed. This device, because of its inherent characteristics, at the same time may be made much smaller and lighter in weight than presently used equipment offering advantages in ease of handling and saving of gear. For example, a suitable embodiment of my device is but 30" x 44", weighing 240 lbs., as compared with typical otter boards now in use of 36" x 66" size, weighing from 450 to 550 lbs. The top plates provide a stable lateral lift which causes the starboard and port trawling devices to plane outwardly from and at a wide angle to the tow direction, thereby spreading the mouth of the net to its optimum extent. The top plate greatly increases the hydro-dynamic lateral lift efficiency as well as longitudinal stability of the device under tow, and serves to minimize any porpoising tendency thereof. The bottom plate also, to some extent, increases longitudinal stability and supports the board on the bottom to ride easily thereover without plowing up the bottom in front of or inside the lower portions of the device, as is common with otter boards in current use.

In the appended claims the expression "along the sea bottom" is intended to mean either in direct contact with or vertically spaced from the sea bottom, depending on the requirements of different fishing operations.

I claim:

1. A trawling device of the class described, adapted to be towed in a substantially vertical position along the sea bottom comprising a transversely curved vertical plate, a deflecting top plate secured and extending substantially horizontally adjacent to the top edge of said vertical plate with its longitudinal axis substantially aligned with the upper edge of said vertical plate, said vertical plate having a bottom edge curved upwardly at one end thereof, and a bottom plate having a curvature substantially corresponding to the upward curvature of said bottom edge of said vertical plate and secured adjacent to the bottom of said vertical plate.

2. A trawling device of the class described, adapted to be towed in a substantially vertical position along the sea bottom comprising a transversely curved vertical plate, a deflecting top plate secured and extending substantially horizontally adjacent to the top edge of said vertical plate with its longitudinal axis substantially aligned with the upper edge of said vertical plate, said vertical plate having a bottom edge curved upwardly at one end thereof, and a bottom plate having a curvature substantially corresponding to the upward curvature of said bottom edge of said vertical plate and secured adjacent to the bottom of said vertical plate, said bottom plate extending outwardly and downwardly from said vertical plate.

3. A trawling device of the class described, adapted to be towed in a substantially vertical position along the sea bottom comprising a transversely curved vertical plate, a deflecting top plate secured and extending substantially horizontally adjacent to the top edge and the full longitudinal extent of said vertical plate with its longitudinal axis substantially aligned with the upper edge of said vertical plate, said vertical plate having a bottom edge curved upwardly at one end thereof, and a bottom plate having a curvature substantially corresponding to the upward curvature of said bottom edge of said vertical plate and secured adjacent to the bottom of said vertical plate, said bottom plate extending outwardly and downwardly from said vertical plate, and means secured to the device to tow the same through the water.

HENRY A. SCHEEL.

REFERENCES CITED

The following references are of record in the file of this patent:

UNITED STATES PATENTS

| Number | Name | Date |
|---|---|---|
| 1,449,910 | Oertz | Mar. 27, 1923 |
| 1,683,668 | Hansen et al. | Sept. 11, 1928 |

FOREIGN PATENTS

| Number | Country | Date |
|---|---|---|
| 357,298 | Great Britain | Sept. 24, 1931 |